US009953183B2

(12) United States Patent
Peterson et al.

(10) Patent No.: US 9,953,183 B2
(45) Date of Patent: Apr. 24, 2018

(54) USER VERIFICATION USING TOUCH AND EYE TRACKING

(71) Applicant: Lenovo (Singapore) Pte. Ltd., Singapore (SG)

(72) Inventors: Nathan J. Peterson, Durham, NC (US); Rod D Waltermann, Rougemont, NC (US); John Carl Mese, Cary, NC (US); Arnold S. Weksler, Raleigh, NC (US); Russell Speight VanBlon, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 46 days.

(21) Appl. No.: 15/083,695

(22) Filed: Mar. 29, 2016

(65) Prior Publication Data

US 2016/0283734 A1 Sep. 29, 2016

Related U.S. Application Data

(62) Division of application No. 14/495,200, filed on Sep. 24, 2014, now Pat. No. 9,355,237.

(51) Int. Cl.
| | |
|---|---|
| *G06F 21/62* | (2013.01) |
| *G06F 3/0488* | (2013.01) |
| *G06F 21/32* | (2013.01) |
| *G06T 11/60* | (2006.01) |
| *G06F 3/01* | (2006.01) |
| *G06F 21/31* | (2013.01) |
| *G06F 3/041* | (2006.01) |
| *G06K 9/00* | (2006.01) |

(52) U.S. Cl.
CPC .......... *G06F 21/6218* (2013.01); *G06F 3/013* (2013.01); *G06F 3/0416* (2013.01); *G06F 3/04883* (2013.01); *G06F 21/31* (2013.01); *G06F 21/32* (2013.01); *G06K 9/0061* (2013.01); *G06K 9/00288* (2013.01); *G06K 9/00617* (2013.01); *G06T 11/60* (2013.01)

(58) Field of Classification Search
CPC ............. G06F 21/6218; G06F 3/04883; G06F 3/0416; G06F 21/31; G06F 21/32; G06F 3/013; G06K 9/00617; G06K 9/00288; G06K 9/0061; G06T 11/60
See application file for complete search history.

(56) References Cited

U.S. PATENT DOCUMENTS 9,256,071 B1 * 2/2016 Spitzer ................ G02B 27/017
9,355,237 B2 5/2016 Peterson et al.
9,357,388 B2 5/2016 Grimme et al.
(Continued)

OTHER PUBLICATIONS

"U.S. Appl. No. 14/495,200, Notice of Allowance dated Mar. 2, 2016", 12 pgs.
(Continued)

*Primary Examiner* — Mary Li
(74) *Attorney, Agent, or Firm* — Schwegman Lundberg & Woessner, P.A.

(57) ABSTRACT

A method includes receiving at a processor, an indication of a user touching a point on a data entry device, receiving at the processor, an indication of a user gazing in a direction, and comparing via the processor the touched point and the gazing direction to a known touch point and gaze direction to verify the user is an authorized user.

10 Claims, 4 Drawing Sheets

(56) References Cited

U.S. PATENT DOCUMENTS

| | | |
|---|---|---|
| 2004/0085351 A1 | 5/2004 | Tokkonen |
| 2010/0097324 A1* | 4/2010 | Anson ................. G06F 3/04883 345/173 |
| 2012/0243729 A1* | 9/2012 | Pasquero ................ G06F 3/013 382/103 |
| 2014/0247208 A1 | 9/2014 | Henderek et al. |
| 2016/0085949 A1 | 3/2016 | Peterson et al. |

OTHER PUBLICATIONS

"U.S. Appl. No. 14/495,200, Response filed Feb. 5, 2016 to Restriction Requirement dated Dec. 7, 2015", 8 pgs.
"U.S. Appl. No. 14/495,200, Restriction Requirement dated Dec. 7, 2015", 6 pgs.

* cited by examiner

USER VERIFICATION USING TOUCH AND EYE TRACKING

CLAIM FOR PRIORITY

This application is a divisional application of and claims the benefit of prior to U.S. patent application Ser. No. 14/495,200, filed on Sep. 24, 2014.

BACKGROUND

Current methods of verifying a user include use of a touch screen to trace or touch a pattern on the screen. Such methods may result in visible residue on the screen that may be viewed to identify the pattern used to verify the user, and allow an unauthorized user to access a device. Current solutions for login security utilize moving alphanumeric values of touch points so that different physical patterns are used to log in to a device. The moving of such values inhibits following the visible residue to guess the pattern.

SUMMARY

A method includes receiving at a processor, an indication of a user touching a point on a data entry device, receiving at the processor, an indication of a user gazing in a direction, and comparing via the processor the touched point and the gazing direction to a known touch point and gaze direction to verify the user is an authorized user.

A machine readable storage device having instructions for execution by a processor of a machine, the instructions including instructions to perform receiving at a processor, an indication of a user touching a point on a data entry device, receiving at the processor, an indication of a user gazing in a direction, and comparing via the processor the touched point and the gazing direction to a known touch point and gaze direction to verify the user is an authorized user.

A device includes a processor and a memory device having a program stored thereon for execution by the processor to receive at a processor, an indication of a user touching a point on a data entry device, receive at the processor, an indication of a user gazing in a direction, and compare via the processor the touched point and the gazing direction to a known touch point and gaze direction to verify the user is an authorized user.

A further method includes receiving at a processor, an image of a face of a user using a device, performing facial recognition via the processor using the received image to identify an authorized user corresponding to the image, receiving at the processor, an indication of a user gazing in a direction, obtaining a known gaze direction corresponding to the identified user via the facial recognition, and comparing via the processor the known gaze direction to the indication of the user gaze direction to verify the user is the authorized user and allow the user access to the device.

A further device includes a processor and a memory device having a program stored thereon for execution by the processor to receive at the processor, an image of a face of a user using a device, perform facial recognition via the processor using the received image to identify an authorized user corresponding to the image, receive at the processor, an indication of a user gazing in a direction, obtain a known gaze direction corresponding to the identified user via the facial recognition, and compare via the processor the known gaze direction to the indication of the user gaze direction to verify the user is the authorized user and allow the user access to the device.

DETAILED DESCRIPTION

In the following description, reference is made to the accompanying drawings that form a part hereof and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of hardware based storage devices, either local or networked. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

Figure 1:
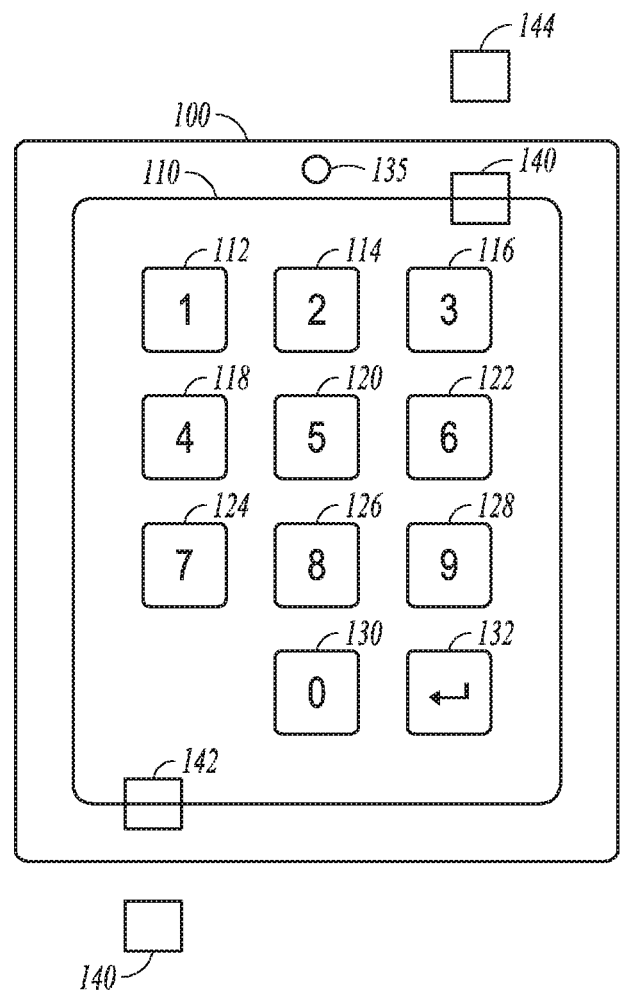
FIG. 1 is atop view representation of a device for receiving touch and gaze information to verify a user according to an example embodiment.

FIG. 1 is a top view representation of a device 100 for receiving touch and gaze information to verify a user. Device 100 comprises a housing, also indicated at 100, in one embodiment, also indicated at 100, and may be a touchpad, smart phone, lap top computer, or other computing device. A data entry device 110 may be a touch screen or keypad in various embodiments, with areas or keys containing alphanumeric symbols for a user to select by pressing or touching indicated at 112, 114, 116, 118, 120, 122, 124, 126, 128, and 130. Such symbols may be referred to as touch points. An enter key 132 may also be provided.

A camera 135 may be supported by the housing 100 and may be used to provide images of a user's eyes from which a gaze direction may be derived. The camera may be integrated into the device 100, or may be separate therefrom, but positioned to determine where a user is gazing with respect to the device 100. For instance, camera 135 may clip to the top of a display device of a desk top computer in some embodiments. Several different gaze points are illustrated. Gaze points 140 and 142 are shown within the housing 100, while gaze points 144 and 146 are shown outside the confines of the housing. Other gaze points may include one or more of the alphanumeric symbols in one embodiment.

In one embodiment, an ordered series of touch and gaze points may be used to verify a user. Once the points have been properly selected by the user and match a series of points corresponding to the user, the user may be verified. For instance, one example series or sequence of points may include touch point 128, followed by gaze point 144, followed by touch points 112 and 114. In this simple example, four points are used, three touch points and one gaze point. In further examples, shorter or longer sequences of touch and gaze points may be used. Multiple successive gaze points may be used along with at least one touch point in one embodiment. In further embodiments, the gaze points may be located outside the confines of the device, or may even overlap with a touch point.

In some embodiments, a gaze point may be used at the same time that a touch point is selected. For instance, a user may be required to gaze at gaze point 144 at the same time as selecting touch point 114. In further embodiments, a window of time for gazing at a gaze point may begin following selection of a touch point. Similarly, multiple successive gaze points may include similar windows, each beginning upon successful selection of a previous point, be it a previous gaze point or a previous touch point.

In still further embodiments, the camera 135 is used to capture various motions of the eye, referred to as eye tracking. Selection of a gaze point may include detection of the user blinking, or even just looking generally in one direction, such as left, right, up, or down, and not at any discrete point.

The touch points may also include a swiping motion between points, or swiping a pattern anywhere on the touch screen. Once the swiping motion is detected, along with at least one eye tracking event, such as looking in a particular direction, blinking, or gazing at a particular point, the points may be compared to a known pattern corresponding to a user in order to verify the user and allow access to device 100.

Figure 2:
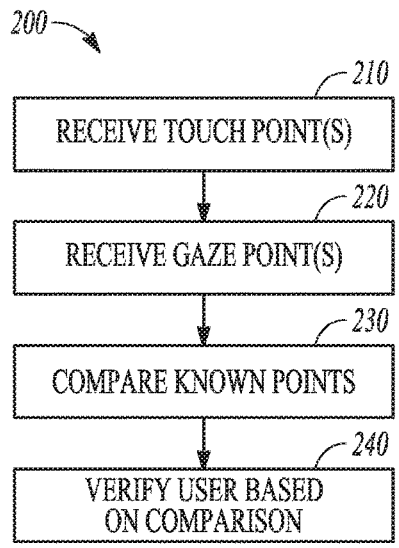
FIG. 2 is a flowchart illustrating a method of verifying a user via touch and gaze information according to an example embodiment.

FIG. 2 is a flowchart illustrating a method 200 of verifying a user via touch and gaze information according to an example embodiment. Method 200 in one embodiment includes receiving one or more touch points 210 corresponding to an indication of a user touching a point on a data entry device. The data entry device may be a touch screen, key pad, pointing device selection on a display, or other means of selecting a point or alphanumeric character.

At 220, an indication of a user gazing in a direction is received by the processor. The indication may be provided by a camera in the form of images of a user's eyes. The processor may use the images to perform eye tracking analysis to determine the direction of gaze of the user or other gaze information such as general direction of gaze, blinking, or other motions of the eye, such as rolling, scanning, squinting, etc.

At 230, the processor compares the touch and gaze points to a sequence of points corresponding to a user. If the comparison is positive, the user is verified as an authorized user at 240.

In various embodiments, the data entry device comprises a touch screen display and the touch point on the display comprises multiple ordered points on the display. The gaze points or gaze direction may include multiple ordered gazing directions. Blocks 210 and 220 corresponding to receipt of user actions corresponding to selection of the points need not occur in the order shown. In other words, multiple touch points and gaze points may be received in any order. However, in some embodiments, the order of receipt is tracked for use in the comparison at 230. The sequence in one embodiment must match a known sequence for a user for the user to be verified.

In one embodiment, the point on the data entry device comprises multiple ordered points on a touch screen display, and wherein the gazing direction comprises multiple ordered gazing directions and wherein the points and directions are intermixed in a specified order. The gaze direction may correspond to a gaze point on the data entry device or outside an area of the data entry device. In some embodiments, the gaze point on the data entry device comprises a displayed alphanumeric symbol that may also be a touch point. The alphanumeric symbol may be a number. In still further embodiments, verifying that the user is an authorized user may depend on a touch point being touched at the same time that the user gazes at a gaze point, which may or may not be different than the touch point.

Figure 3:
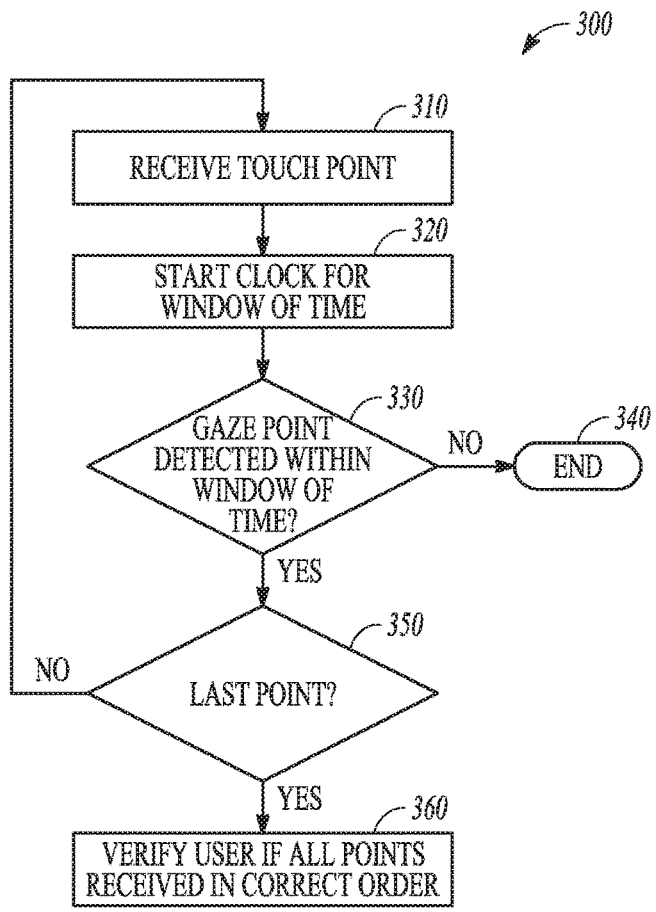
FIG. 3 is a flowchart illustrating a method of verifying a user via touch and gaze information within a window of tune according to an example embodiment.

FIG. 3 is a flowchart illustrating a method 300 of verifying a user via touch and gaze information within a window of time according to an example embodiment. At 310, an indication of a point being touched is received. At 320, a clock for a window of time is started when the indication of the point being touched is received. At 330, the method determines if a gaze point is detected within the window of time. The window of time may be a few seconds in one embodiment. If the proper gaze is not detected within the window of time, the method ends at 340, and the user is not verified.

In some embodiments, the user may start over at 310. If the gaze point is detected within the window of time, at 350, the method determines whether the last point in the sequence has been reached. If not, further points may be received as indicated at 310. If the last point in the sequenced has been reached at 350, the sequence is compared with a known sequence to verify if all the points were received in the correct order, and if they match those corresponding to the user in order to verify the user as an authorized user.

In various embodiments, the window of time may be short enough to prevent a user from looking in multiple different directions in an attempt to fool the system. In some embodiments, the user may be required to look quickly in the proper direction without looking in a different direction first. In other words, once the previous point is selected, the user should immediately begin looking toward the proper gaze point. Attempts to look multiple places may be detected utilizing eye tracking, and result in an invalid sequence. In some embodiments, detection of a proper gaze point selection may include gazing at a point for a selected amount of time, such as one or two seconds in order to properly be detected as a gaze. The device may provide some type of visual or oral feedback once a proper gaze has been detected. The feedback may or may not depend on whether the correct gaze point has been selected by the user with the proper gaze.

Figure 4:
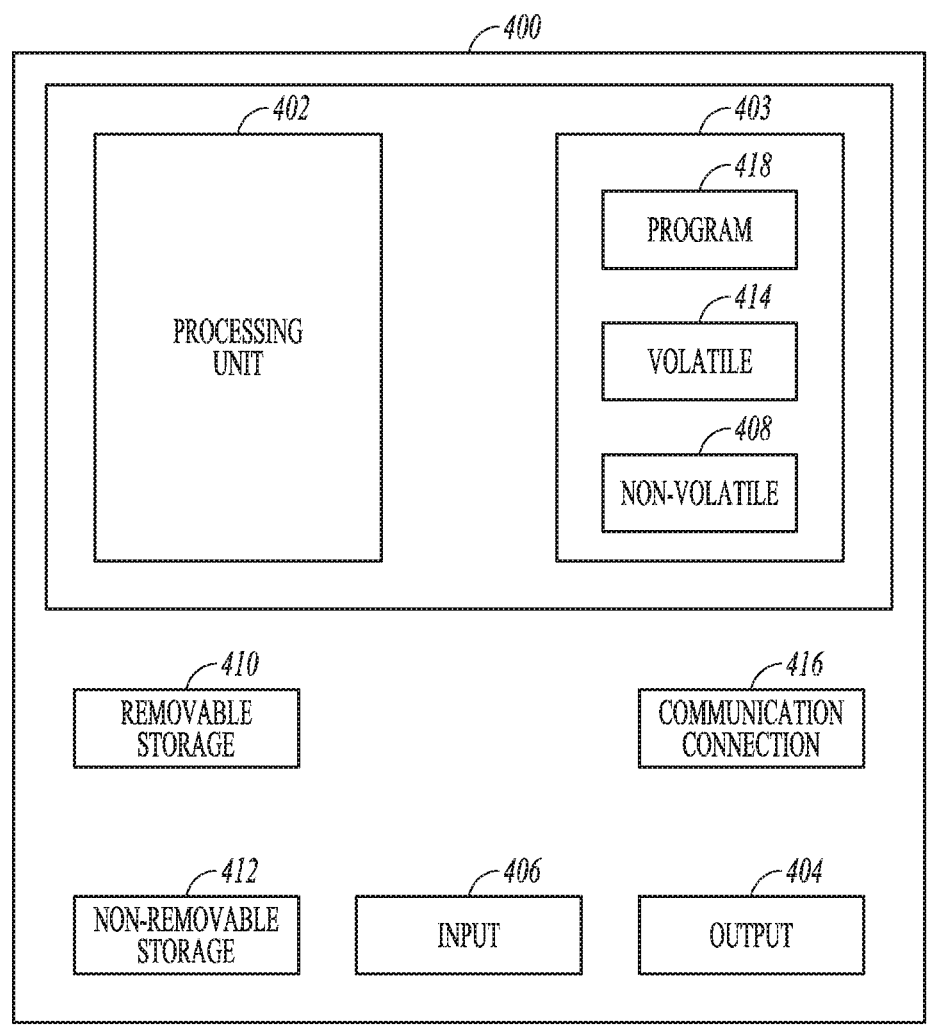
FIG. 4 is a block diagram of computer system used to implement methods according to an example embodiment.

FIG. 4 is a block schematic diagram of a computer system 400 to implement methods according to example embodiments. All components need not be used in various embodiments. One example computing device in the form of a computer system 400, may include a processing unit 402, memory 403, removable storage 410, and non-removable storage 412. Sensors 115 and 125 may be coupled to provide data to the processing unit 402. Memory 403 may include volatile memory 414 and non-volatile memory 408. Computer 400 may include or have access to a computing environment that includes—a variety of computer-readable media, such as volatile memory 414 and non-volatile memory 408, removable storage 410 and non-removable storage 412. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 400 may include or have access to a computing environment that includes input 406, output 404, and a communication connection 416. Output 404 may include a display device, such as a touchscreen, that also may serve as an input device. The computer may operate in a networked environment using a communication connection to connect to one or more remote computers, such as database servers. The remote computer may include a personal computer (PC), laptop, touchpad, smart phone, server, router, network PC, a peer device or other common network node, or the like. The communication connection may include a Local Area Network (LAN), a Wide Area Network (WAN), cellular, WiFi, Bluetooth, or other networks.

Computer-readable instructions stored on a computer-readable medium are executable by the processing unit 402 of the computer 400. A hard drive, CD-ROM, and RAM are some examples of articles including a non-transitory computer-readable medium such as storage devices. The terms non-transitory computer-readable medium and storage devices do not include carrier waves. For example, a computer program 418 capable of providing a generic technique to perform access control check for data access and/or for doing an operation on one of the servers in a component object model (COM) based system may be included on a CD-ROM and loaded from the CD-ROM to a hard drive. The computer-readable instructions allow computer 400 to provide generic access controls in a COM based computer network system having multiple users and servers.

Figure 5:
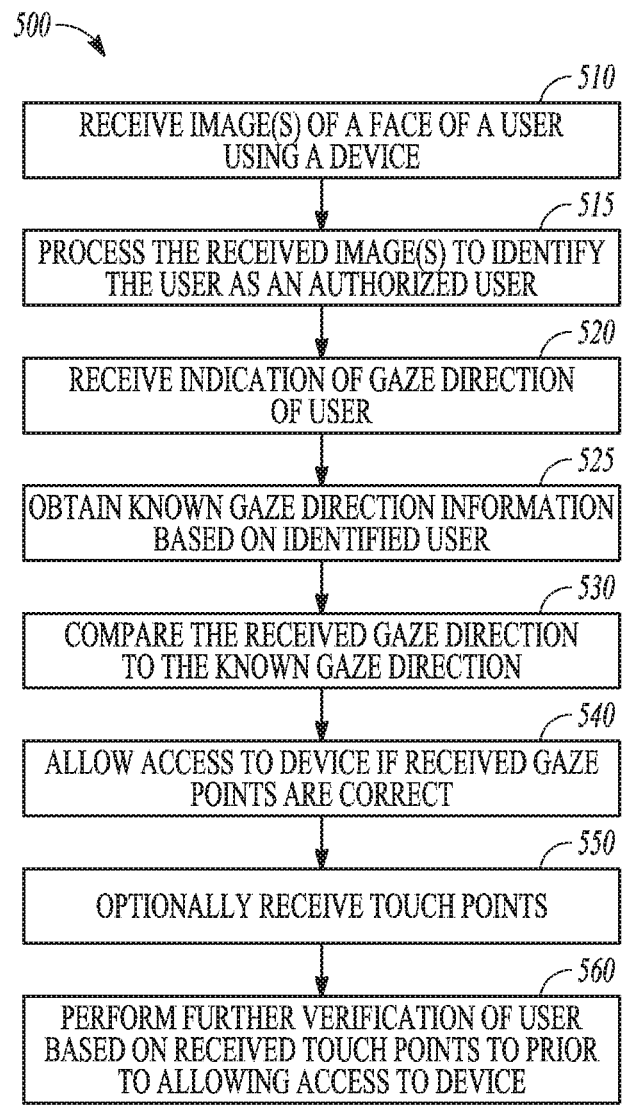
FIG. 5 is a flowchart illustrating a method of verifying a user via facial recognition and gaze information according to an example embodiment.

FIG. 5 is a flowchart illustrating a method 500 of verifying a user via facial recognition and gaze information according to an example embodiment. At 510, the camera is used to obtain one or more images of a face of a user attempting to log into a system. At 515, off the shelf image processing algorithms may be used to recognize and identify the user as an authorized user. At 520, an indication of the user gazing in a direction or at a particular point is received by the processor. The indication may be provided by a camera in the form of images of a user's eyes. The processor may use the images to perform eye tracking analysis to determine the point or direction of gaze of the user or other gaze information such as general direction of gaze, blinking, or other motions of the eye, such as rolling, scanning, squinting, etc.

At 525, the processor obtains a known gaze direction corresponding to the identified user. The known gaze direction may be a known sequence of points corresponding to the identified user. The sequence may be one or more points or directions associated with the identified user. The sequence may be obtained from a database of authorized users in one embodiment.

At 530, the processor compares the received gaze point or points to the known points. If the comparison is positive, the user is verified as an authorized user at 540 and allowed to access the device. If both the face image and the received gaze points are correct, the user is verified and able to log in to the system, or in some events, continue using the system.

In further embodiments, facial identification, gaze points, and touch points may be combined as indicated at 550, prior to allowing access based on further verification including use of the touch points at 560, to provide an even more secure and robust user verification system. The touch points may be received by a data entry device comprising a touch screen display and the touch points on the display may comprise multiple ordered points on the display. The gaze points or gaze direction may include multiple ordered gazing points or directions. User actions corresponding to selection of the points need not occur in the order shown. In other words, multiple touch points and gaze points may be received in any order. However, in some embodiments, the order of receipt is tracked for use in the comparison at 530. The sequence in one embodiment must match a known sequence for a user for the user to be verified.

In one embodiment, the point on the data entry device comprises multiple ordered points on a touch screen display, and wherein the gazing direction comprises multiple ordered gazing directions and wherein the points and directions are intermixed in a specified order. The gaze direction may correspond to a gaze point on the data entry device or outside an area of the data entry device. In some embodiments, the gaze point on the data entry device comprises a displayed alphanumeric symbol that may also be a touch point. The alphanumeric symbol may be a number. In still further embodiments, verifying that the user is an authorized user may depend on a touch point being touched at the same time that the user gazes at a gaze point, which may or may not be different than the touch point.

Examples

1. A method comprising:
receiving at a processor, an indication of a user touching a point on a data entry device;
receiving at the processor, an indication of a user gazing in a direction; and
comparing via the processor the touched point and the gazing direction to a known touch point and gaze direction to verify the user is an authorized user.

2. The method of example 1 wherein data entry device comprises a touch screen display and the point on the display comprises multiple ordered points on the display.

3. The method of any of examples 1-2 wherein the gazing direction comprises multiple ordered gazing directions.

4. The method of any of examples 1-3 wherein the point on the data entry device comprises multiple ordered points on a touch screen display, and wherein the gazing direction comprises multiple ordered gazing directions and wherein the points and directions are intermixed in a specified order.

5. The method of any of examples 1-5 wherein the gaze direction corresponds to a gaze point on the data entry device.

6. The method of example 5 wherein the gaze point on the data entry device comprises a displayed alphanumeric symbol.

7. The method of example 6 wherein the alphanumeric symbol comprises a number representative of an order of touch and gaze points.

8. The method of any of examples 5-7 and further comprising beginning a window of tune following receipt of a touch point, and determining whether the user has gazed at the gaze point within the window of time.

9. The method of any of examples 5-8 and further comprising verifying that the user is an authorized user when a touch point is touched at the same time that the user gazes at a gaze point.

10. The method of any of examples 1-10 wherein the gaze direction corresponds to a point outside an area of the data entry device.

11. A machine readable storage device having instructions for execution by a processor of a machine, the instructions comprising instructions to perform:
receiving at a processor, an indication of a user touching a point on a data entry device;
receiving at the processor, an indication of a user gazing in a direction; and
comparing via the processor the touched point and the gazing direction to a known touch point and gaze direction to verify the user is an authorized user.

12. The machine readable storage device of example 11 wherein the point on the data entry device display comprises multiple ordered points on a touch screen display, wherein the gazing direction comprises multiple ordered gazing directions, and wherein the points and directions are intermixed in a specified order.

13. The machine readable storage device of any of examples 11-12 wherein the gaze direction corresponds to a gaze point on a touch screen of the data entry device, wherein multiple touch points and gaze points are received, and further comprising:
verifying the user based on receiving indications of touching and gazing the points in a predetermined order;
beginning a window of time following receipt of a touch point; and
determining whether the user has gazed at the gaze point within the window of time.

14. A device comprising:
a processor; and
a memory device having a program stored thereon for execution by the processor to:
receive at a processor, an indication of a user touching a point on a data entry device;
receive at the processor, an indication of a user gazing in a direction; and
compare via the processor the touched point and the gazing direction to a known touch point and gaze direction to verify the user is an authorized user.

15. The device of example 14 and further comprising:
a camera coupled to provide the indication of the user gazing in the direction in the form of images of the user gazing; and
a housing to support the camera, processor, and memory, wherein the point on the data entry device comprises multiple ordered points on the data entry device and wherein the gazing direction comprises multiple ordered gazing directions, wherein the touch points and gaze points are intermixed in a specified order.

16. The device of any of examples 14-15 wherein the processor further comprising begins a window of time following receipt of a touch point, and determines whether the user has gazed at the gaze point within the window of time.

17. The device of any of examples 14-16 wherein the point on the data entry device display comprises multiple ordered points on a touch screen display.

18. The device of any of examples 14-17 wherein the gazing direction comprises multiple ordered gazing directions.

19. The device of any of examples 14-18 wherein the point on the data entry device comprises multiple ordered points on a touch screen display, and wherein the gazing direction comprises multiple ordered gazing directions and wherein the points and directions are intermixed in a specified order.

20. The device of any of examples 14-19 wherein the gaze direction corresponds to a gaze point on a touch screen of the data entry device and wherein multiple touch points and gaze points are received, and wherein the processor further verifies the user based on receiving indications of touching and gazing the points in a predetermined order.

21. A method comprising:
receiving at a processor, an image of a face of a user using a device;
performing facial recognition via the processor using the received image to identify an authorized user corresponding to the image;
receiving at the processor, an indication of a user gazing in a direction;
obtaining a known gaze direction corresponding to the identified user via the facial recognition; and
comparing via the processor the known gaze direction to the indication of the user gaze direction to verify the user is the authorized user and allow the user access to the device.

22. The method of example 21 wherein the gaze direction comprises multiple ordered gazing directions.

23. The method of any of examples 21-22 wherein the gaze direction corresponds to a gaze point on the data entry device.

24. The method of example 23 wherein the gaze point on the data entry device comprises a displayed alphanumeric symbol.

25. The method of example 24 wherein the alphanumeric symbol comprises a number representative of an order gaze points.

26. The method of any of examples 21-25 and further comprising
receiving at the processor, an indication of a user touching a point on a data entry device of the device; and
comparing via the processor the touched point along with the gaze direction to a known touch point and gaze direction to verify the user is an authorized user.

27. A device comprising:
a processor; and
a memory device having a program stored thereon for execution by the processor to:
receive at the processor, an image of a face of a user using a device;
perform facial recognition via the processor using the received image to identify an authorized user corresponding to the image;
receive at the processor, an indication of a user gazing in a direction;
obtain a known gaze direction corresponding to the identified user via the facial recognition; and
compare via the processor the known gaze direction to the indication of the user gaze direction to verify the user is the authorized user and allow the user access to the device.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following

The invention claimed is:

1. A method comprising:
receiving at a processor, an image of a face of a user using a device;
performing facial recognition via the processor using the received image to identify an authorized user corresponding to the image;
receiving a touch point via the device;
beginning a window of time following receipt of the touch point,
receiving at the processor, an indication of a user gazing in a direction;
determining whether the user has gazed in a gaze direction within the window of time, wherein responsive to the user looking in a different direction following receipt of the touch point before looking in the gaze direction, the user is not verified as the authorized user.

2. The method of claim 1 wherein the gaze direction comprises multiple ordered gazing directions.

3. The method of claim 1 wherein the gaze direction corresponds to a gaze point on a data entry device.

4. The method of claim 3 wherein the gaze point on the data entry device comprises a displayed alphanumeric symbol.

5. The method of claim 4 wherein the alphanumeric symbol comprises a number representative of an order gaze points.

6. The method of claim 1 and further comprising
receiving at the processor, an indication of a user touching a point on a data entry device of the device; and
comparing via the processor the touched point along with the gaze direction to a known touch point and gaze direction to verify the user is an authorized user.

7. A device comprising:
a processor; and
a memory device having a program stored thereon for execution by the processor to:
receive at the processor, an image of a face of a user using a device;
perform facial recognition via the processor using the received image to identify an authorized user corresponding to the image;
receive a touch point via the device;
beginning a window of time following receipt of the touch point;
receive at the processor, an indication of a user gazing in a direction; and
determine whether the user has gazed in a gaze direction within the window of time, wherein responsive to the user looking in a different direction following receipt of the touch point before looking in the gaze direction, the user is not verified as the authorized user.

8. The method of claim 2, wherein the window of time is short enough to prevent a user from looking in multiple different directions in an attempt to circumvent the method of verification.

9. The method of claim 2, wherein the window of time is short enough to prevent a user from looking in multiple different directions in an attempt to circumvent the method of verification.

10. A non-transitory computer-readable medium storing executable computer instructions, the computer instructions, when executed by a hardware processor, configured to perform steps comprising:
receiving at a processor, an image of a face of a user using a device;
performing facial recognition via the processor using the received image to identify an authorized user corresponding to the image;
receiving a touch point via the device;
beginning a window of time following receipt of the touch point,
receiving at the processor, an indication of a user gazing in a direction;
determining whether the user has gazed in a gaze direction within the window of time, wherein responsive to the user looking in a different direction following receipt of the touch point before looking in the gaze direction, the user is not verified as the authorized user.

* * * * *